United States Patent
Wakatani

[11] Patent Number: 5,274,835
[45] Date of Patent: Dec. 28, 1993

[54] MERGE DEVICE USING FIFO BUFFERS

[75] Inventor: Akiyoshi Wakatani, Osaka, Japan

[73] Assignee: Matsushita Electric Industrial Co., Ltd., Osaka, Japan

[21] Appl. No.: 958,465

[22] Filed: Oct. 8, 1992

Related U.S. Application Data

[63] Continuation of Ser. No. 450,771, Dec. 14, 1989.

[30] Foreign Application Priority Data

Dec. 20, 1988 [JP] Japan ................. 63-321199

[51] Int. Cl.⁵ ............................................. G06F 7/14
[52] U.S. Cl. ...................... 395/800; 340/146.2; 364/238.7; 364/259.2; 364/222.9; 364/947.2; 364/965.7; 364/DIG. 1; 395/250; 395/500
[58] Field of Search ............ 340/146.2; 395/250, 395/500, 700, 800

[56] References Cited

U.S. PATENT DOCUMENTS

| | | | |
|---|---|---|---|
| 3,931,612 | 1/1976 | Stevens et al. | 364/900 |
| 4,030,077 | 6/1977 | Florence et al. | 395/800 |
| 4,031,520 | 6/1977 | Rohner | 395/800 |
| 4,037,205 | 7/1977 | Edelberg et al. | 364/900 |
| 4,178,634 | 12/1979 | Bartlett | 364/900 |
| 4,338,677 | 7/1982 | Morrill, Jr. et al. | 364/900 |
| 4,414,643 | 11/1983 | Meyer | 364/900 |
| 4,464,732 | 8/1984 | Clark | 364/900 |
| 4,520,456 | 5/1985 | Miranker et al. | 364/900 |
| 4,567,572 | 1/1986 | Morris et al. | 364/900 |
| 4,628,438 | 12/1986 | Nelson | 364/900 |
| 4,723,206 | 2/1988 | Kojima et al. | 364/200 |
| 4,773,006 | 9/1988 | Kinoshita et al. | 364/200 |
| 4,779,192 | 10/1988 | Torii et al. | 364/200 |
| 4,799,152 | 1/1989 | Chuang et al. | 364/200 |
| 4,860,245 | 8/1989 | Kinoshita | 364/900 |
| 4,933,839 | 6/1990 | Kinoshita et al. | 364/200 |
| 4,991,134 | 2/1991 | Ivsin | 364/900 |
| 5,091,848 | 2/1992 | Kojima | 395/800 |

*Primary Examiner*—Parshotam S. Lall
*Assistant Examiner*—Ken S. Kim
*Attorney, Agent, or Firm*—Lowe, Price, LeBlanc & Becker

[57] ABSTRACT

Input FIFO buffers serve to store sorted data. A number of the input FIFO buffers equals a first predetermined number N equal to $2^n$ where n denotes a second predetermined number. A number of comparators equals the second predetermined number n. Intermediate FIFO buffers each have a capacity corresponding to at least two words. A number of the intermediate FIFO buffers equals the first predetermined number N minus 2. Identification numbers (i,j) are assigned to the intermediate FIFO buffers respectively wherein $i=1, n-1$ and where $j=1, 2^{(n-1)}$. A first of the comparators outputs a merge result of an i-th of the input FIFO buffers and an $(i+N/2)$-th of the input FIFO buffers to a $(1,i)$-th of the intermediate FIFO buffers where $i=1, N/2$. A j-th of the comparators outputs a merge result of a $(j-1,i)$-th of the intermediate FIFO buffers and a $(j-1,i+2^{(n-i)})$-th of the intermediate FIFO buffers to a $(j,i)$-th of the intermediate FIFO buffers where $j=2, n-1$ and where $i=1, 2^{(n-i)}$. An n-th of the comparators outputs a merge result of an $(n-1,1)$-th of the intermediate FIFO buffers and an $(n-1,2)$-th of the intermediate FIFO buffers to an output FIFO buffer.

4 Claims, 11 Drawing Sheets

| DEVICE | TIME | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| INT FIFO 9 | 0 | 0 | 0 | 0 | 0 | 0 | 0 | 0 | 2 | 2 | 2 | 2 | 11 | 11 | 11 | 11 | 15 | 15 | 15 |
|  | 1 | — | — | — | — | — | — | 2 | 2 | 11 | 11 | 11 | 11 | 15 | 15 | 15 | — | 20 | 20 |
| 10 | 0 | — | — | 3 | 3 | 3 | 3 | 3 | 3 | 3 | 5 | 9 | 9 | 9 | 9 | 9 | 9 | 9 | 9 |
|  | 1 | — | — | — | 5 | 5 | 5 | 5 | 5 | 5 | — | — | — | — | — | — | — | — | — |
| 11 | 0 | — | — | — | — | — | — | — | — | 4 | 4 | 4 | 4 | 10 | 13 | 13 | 13 | 13 | 13 |
|  | 1 | — | — | — | — | — | 4 | 4 | 4 | — | 10 | 10 | 10 | — | — | 18 | 18 | 18 | 18 |
| 12 | 0 | — | — | — | — | — | — | 6 | 6 | 6 | 6 | 6 | 6 | 6 | 6 | — | 7 | 8 | 12 |
|  | 1 | — | — | — | — | — | — | — | 7 | 7 | 7 | 7 | 7 | 7 | 7 | 18 | 18 | 18 | 18 |
| 13 | 0 | — | — | — | — | — | — | — | — | 0 | 0 | — | 2 | 4 | 4 | — | 8 | 8 | — |
|  | 1 | — | — | — | — | — | — | — | — | 1 | — | 1 | — | — | 10 | 10 | 10 | 10 | 10 |
| 14 | 0 | — | — | — | — | — | — | — | — | — | 3 | 3 | 3 | 3 | 5 | 5 | 6 | 7 | 11 |
|  | 1 | — | — | — | — | — | — | — | — | — | — | 5 | 5 | 5 | — | 6 | — | — | 8 |
| OUTPUT FIFO 15 |  | — | — | — | — | — | — | — | — | — | — | 0 | 1 | 2 | 3 | 4 | 5 | 6 | 7 |
| CMP 16 |  | ON | ON | ON | ON | ON | ON | ON | ON | ON | ON | ON | ON | ON | ON | ON | ON | ON | ON |
| CMP 17 |  | — | — | — | — | — | — | — | ON | ON | ON | ON | ON | ON | ON | ON | ON | ON | ON |
| CMP 18 |  | — | — | — | — | — | — | — | — | — | — | ON | ON | ON | ON | ON | ON | ON | ON |

| DEVICE \ TIME | | 1 | 2 | 3 | 4 | 5 | 6 | 7 | 8 | 9 | 10 | 11 |
|---|---|---|---|---|---|---|---|---|---|---|---|---|
| INT FIFO 55 | 0 | 0 | 2 | 11 | 11 | 11 | 11 | 11 | 11 | 15 | 15 | 15 |
| | 1 | — | — | — | 15 | 15 | 15 | 15 | 15 | — | 20 | 20 |
| 56 | 0 | 3 | 3 | 3 | 5 | 5 | 9 | 14 | 14 | 14 | 14 | 14 |
| | 1 | — | 5 | 5 | — | 9 | — | — | 17 | 17 | 17 | 17 |
| 57 | 0 | 1 | 4 | 10 | 10 | 10 | 10 | 10 | 10 | 10 | 10 | 13 |
| | 1 | — | — | — | 13 | 13 | 13 | 13 | 13 | 13 | 13 | — |
| 58 | 0 | 6 | 6 | 6 | 6 | 7 | 7 | 7 | 8 | 8 | 12 | 12 |
| | 1 | — | 7 | 7 | 7 | — | 8 | 8 | — | 12 | — | 16 |
| 59 | 0 | — | 0 | 2 | 2 | 3 | 5 | 5 | 9 | 9 | 9 | 9 |
| | 1 | — | — | — | 3 | — | — | 9 | — | 11 | 11 | 11 |
| 60 | 0 | — | 1 | 1 | 4 | 4 | 4 | 6 | 6 | 7 | 8 | 10 |
| | 1 | — | — | 4 | — | 6 | 6 | — | 7 | — | — | — |
| OUTPUT FIFO 61 | | — | — | 0 | 1 | 2 | 3 | 4 | 5 | 6 | 7 | 8 |
| CMP 62 | | ON | ON | ON | ON | — | — | — | — | — | ON | — |
| CMP 63 | | ON | ON | — | ON | ON | — | ON | ON | — | — | — |
| CMP 64 | | ON | ON | ON | ON | — | — | — | — | — | — | — |
| CMP 65 | | ON | ON | — | — | — | ON | — | — | ON | — | ON |
| CMP 66 | | — | ON | ON | ON | — | ON | ON | — | ON | — | — |
| CMP 67 | | — | ON | ON | — | ON | — | — | ON | — | ON | ON |
| CMP 68 | | — | — | ON | ON | ON | ON | ON | ON | ON | ON | ON |

MERGE DEVICE USING FIFO BUFFERS

This application is a continuation of application Ser. No. 07/450,771 filed Dec. 14, 1989.

BACKGROUND OF THE INVENTION

This invention relates to a merge (merging) device used in various systems such as a system for sorting a large amount of data.

Some data sorting systems include a merge device. The merge device has comparators. As will be explained later, in the prior-art merge device, the activity rate or the actually-used rate of the comparators tends to be low.

Before the detailed description of the invention, a prior-art merge device will be explained for a better understanding of this invention.

Figure 6:
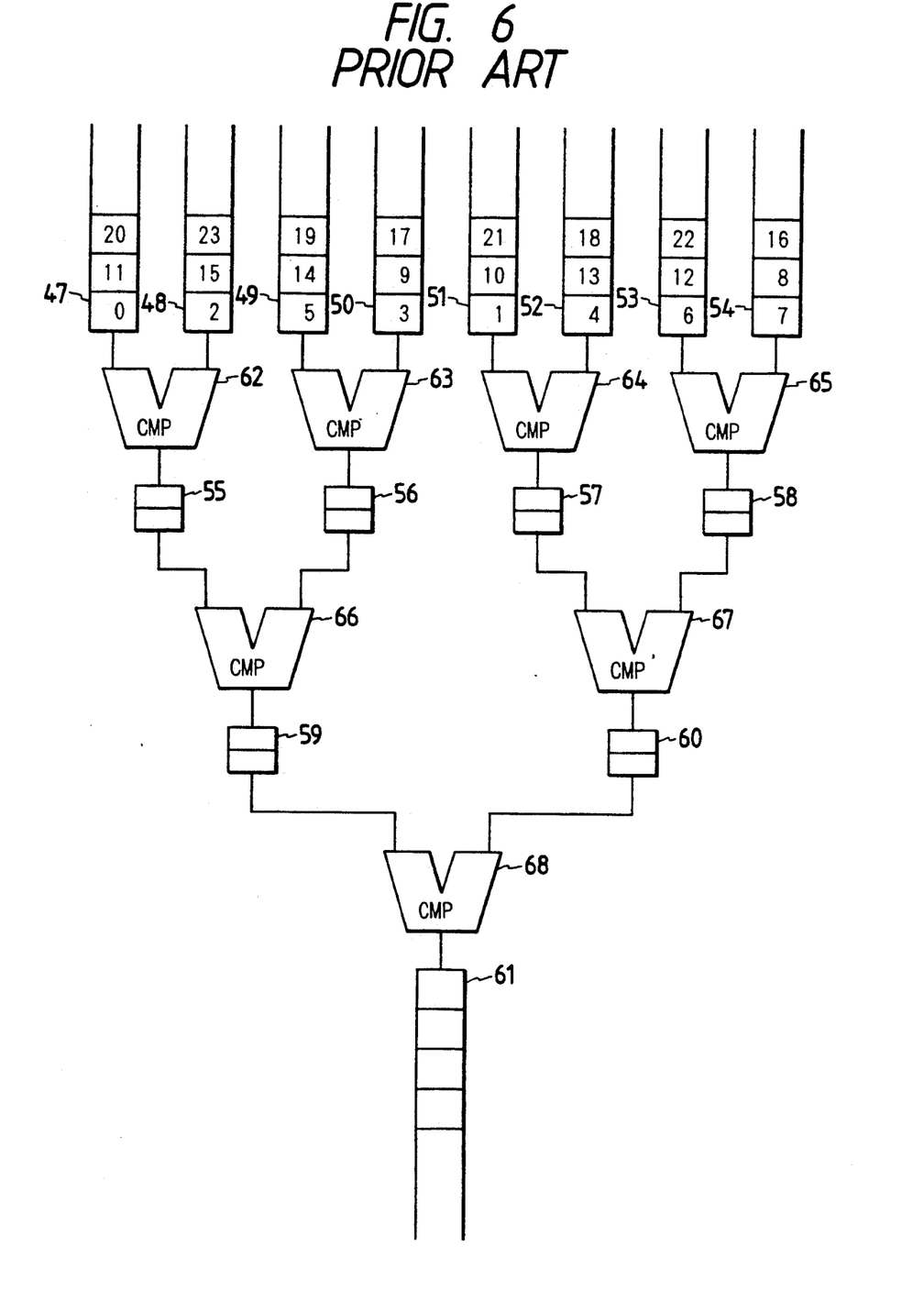
FIG. 6 is a block diagram of a prior-art merge device.

FIG. 6 shows a prior-art merge device which includes a set of input FIFO (First-In First-Out) buffers 47, 48, 49, 50, 51, 52, 53, and 54, a set of first comparators 62, 63, 64, and 65, a set of first intermediate FIFO buffers 55, 56, 57, and 58. The intermediate FIFO buffers 55-58 have a capacity of two data words and are of the two-stage type. The prior-art merge device also includes a set of second comparators 66 and 67, a set of second intermediate FIFO buffers 59 and 60, a third comparator 68, and an output FIFO buffer 61. The intermediate FIFO buffers 59 and 60 have a capacity of two data words and are of the two-stage type.

The operation of the prior-art merge device of FIG. 6 will be described with reference to FIG. 7. In each of the left-hand head sections for the intermediate FIFO buffers of FIG. 7, the numerals "0" and "1" denote the first word storage part and the second word storage part respectively. In the body sections for the intermediate FIFO buffers of FIG. 7, the natural numbers denote the contents of stored data in a decimal expression while the character "-" denotes that the related buffer is completely empty. In the sections for the comparators of FIG. 7, the character "ON" denotes that the related comparator is operating the character "-" denotes that the related comparator is at rest.

The prior-art merge device of FIG. 6 operates as follows. The comparator 62 compares data at a bottom of the input FIFO buffer 47 and data at a bottom of the input FIFO buffer 48 and reads out a smaller of the two data from one of the FIFO buffers 47 and 48. The comparator 62 transfers the readout data to the intermediate FIFO buffer 55. Similarly, a smaller of two data is transferred from one of the input FIFO buffers 49 and 50 to the intermediate FIFO buffer 56 via the comparator 63. A smaller of two data is transferred from one of the input FIFO buffers 51 and 52 to the intermediate FIFO buffer 57 via the comparator 64. A smaller of two-data is transferred from one of the input FIFO buffers 53 and 54 to the intermediate FIFO buffer 58 via the comparator 65. These data comparing and data transferring processes are executed during a period denoted by "TIME 1" in FIG. 7. Thereafter, data are transferred to the intermediate FIFO buffers 55-58 in a similar manner when they become into not-full states. The not-full state means that at least one of the two stages of the related internal FIFO buffer is unoccupied by data.

During a period "TIME 2" in FIG. 7 and later periods, when the intermediate FIFO buffer 59 is in a not-full state, the comparator 66 reads out a smaller of two data from one of the intermediate FIFO buffers 55 and 56 and transfers the readout data to the intermediate FIFO buffer 59. Similarly, when the intermediate FIFO buffer 60 is in a not-full state, the comparator 67 reads out a smaller of two data from one of the intermediate FIFO buffers 57 and 58 and transfers the readout data to the intermediate FIFO buffer 60.

During a period "TIME 3" in FIG. 7 and later periods, the comparator 68 reads out a smaller of two data from one of the intermediate FIFO buffers 59 and 60 and transfers the readout data to the output FIFO buffer 61. Accordingly, during the period "TIME 3" and the later periods, the sorted data are sequentially outputted to the output FIFO buffer 61.

Figure 7:
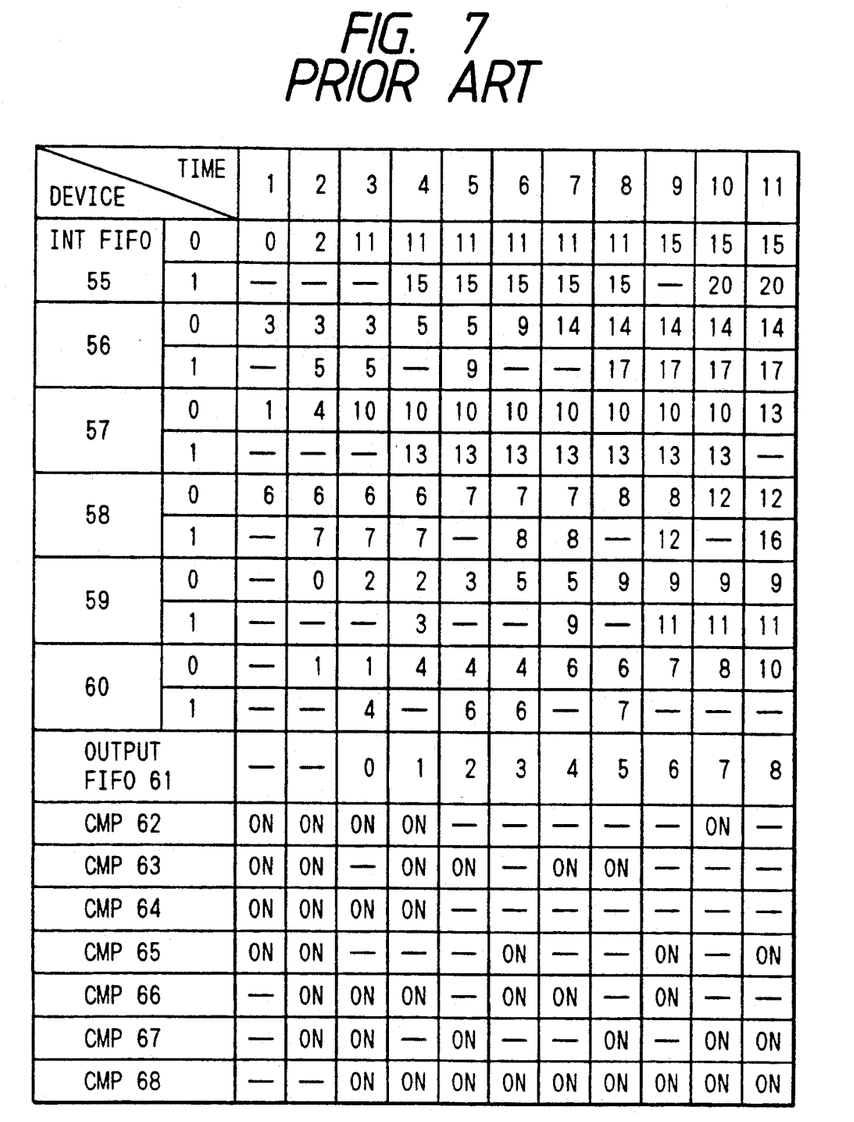
FIG. 7 is a diagram showing the contents of data in the intermediate FIFO buffers and the output FIFO buffer, and the states of the comparators in the prior-art merge device of FIG. 6.

In the prior-art merge device of FIG. 6, as shown in FIG. 7, during a period "TIME 5" and later periods, only three of the seven comparators are operating while the others are at rest. Accordingly, the activity rate of the comparators is low.

SUMMARY OF THE INVENTION

It is an object of this invention to provide an efficient merge device.

According to a first aspect of this invention, a merge device comprises input FIFO buffers for storing sorted data, wherein a number of the input FIFO buffers equals a first predetermined number N equal to $2^n$ where n denotes a second predetermined number; comparators whose number equals the second predetermined number n; intermediate FIFO buffers each having a capacity corresponding to at least two words, wherein a number of the intermediate FIFO buffers equals the first predetermined number N minus 2, and wherein identification numbers (i,j) are assigned to the intermediate FIFO buffers respectively where $i=1$, $n-1$ and where $j=1$, $2^{(n-1)}$; and an output FIFO buffer; wherein a first of the comparators outputs a merge result of an i-th of the input FIFO buffers and an (i+N/2)-th of the input FIFO buffers to a (1,i)-th of the intermediate FIFO buffers where $i=1$, N/2; wherein a j-th of the comparators outputs a merge result of a (j−1,i)-th of the intermediate FIFO buffers and a (j−1,i+$2^{(n-j)}$)-th of the intermediate FIFO buffers to a (j,i)-th of the intermediate FIFO buffers where $j=2$, $n-1$ and where $i=1$, $2^{(n-j)}$; wherein an n-th of the comparators outputs a merge result of an (n−1,1)-th of the intermediate FIFO buffers and an (n−1,2)-th of the intermediate FIFO buffers to the output FIFO buffer.

According to a second aspect of this invention, a merge device comprises four first FIFO buffers; two second FIFO buffers; means for selecting two of the first buffers; and a comparator comparing two data in the respective first buffers selected by said selecting means, the comparator selecting one of the two data in accordance with a result of said comparing and transferring the selected data to one of the second buffers.

According to a third aspect of this invention, a merge device comprises first, second, third, fourth, fifth, sixth, and seventh FIFO buffers, wherein the first buffer and the third buffer form a first pair, and the second buffer and the fourth buffer form a second pair; means for selecting one of the buffer first pair and the buffer second pair in accordance with a control signal; a first comparator comparing two data in the respective buffers in the buffer pair selected by said selecting means, the first comparator selecting one of the two data in the buffers in the selected buffer pair in accordance with said comparing, the first comparator transferring the selected data; means for, when said selecting means selects the buffer first pair, transferring the data selected by the first comparator from one of the buffers in the buffer first pair to the fifth buffer; means for, when said selecting means selects the buffer second pair, transferring the data selected by the first comparator from one of the buffers in the buffer second pair to the sixth buffer; a second comparator comparing two data in the respective fifth and sixth buffers, the second comparator selecting one of the two data in the respective fifth and sixth buffers in accordance with said comparing, the second comparator transferring the selected data from one of the fifth and sixth buffers to the seventh buffer; and means for generating the control signal in accordance with the result of said comparing in the second comparator.

DESCRIPTION OF THE PREFERRED EMBODIMENT

Figure 1:
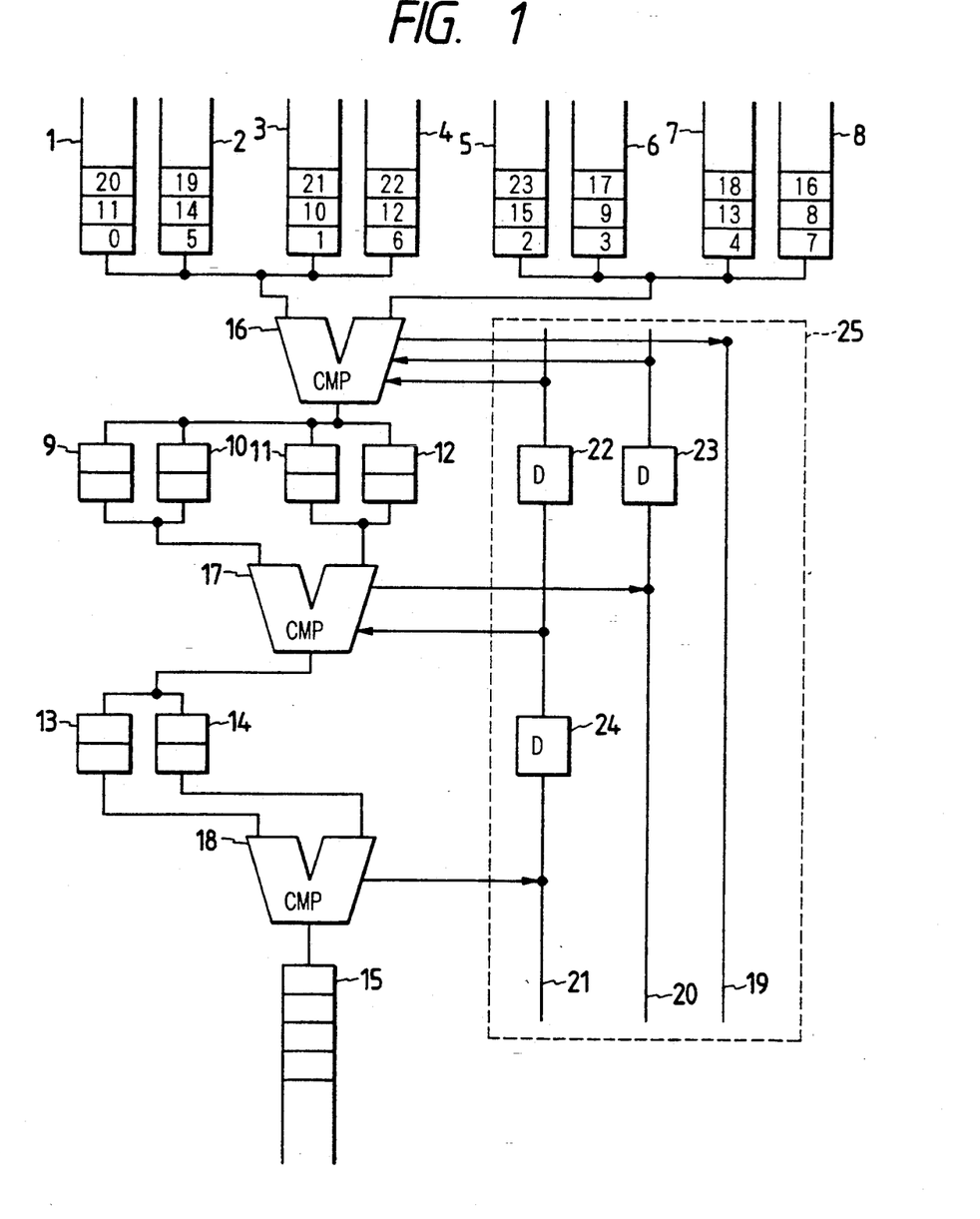
FIG. 1 is a block diagram of a merge device according to an embodiment of this invention.

An embodiment of this invention will now be described in detail. FIG. 1 shows a merge device according to an embodiment of this invention which includes a set of input FIFO (First-In First-Out) buffers 1, 2, 3, 4, 5, 6, 7, and 8, a set of first intermediate FIFO buffers 9, 10, 11, and 12, a set of second intermediate FIFO buffers 13 and 14, and an output FIFO buffer 15. The intermediate FIFO buffers 9-14 have a capacity of two data words and are of the two-stage type. The merge device also includes comparators 16, 17, and 18. In addition, the merge device has a control section 25 including signal lines 19, 20, and 21, and delay elements 22, 23, and 24.

The comparator 16 selects two of data at bottoms of the input FIFO buffers 1-8 and compares the two selected data. In addition, the comparator 16 selects one of the first intermediate FIFO buffers 9-12 and transfers the smaller of the two selected data to the selected first intermediate FIFO buffer. Similarly, the comparator 17 selects two of data at bottoms of the first intermediate FIFO buffers 9-12 and compares the two selected data. In addition, the comparator 17 selects one of the second intermediate FIFO buffers 13-14 and transfers the smaller of the two selected data to the selected second intermediate FIFO buffer. The comparator 18 compares two data at bottoms of the second intermediate FIFO buffers 13 and 14 and transfers the smaller of the two data to the output FIFO buffer 15.

The comparator 16 is changeable among the following three states. The first is a halt state corresponding to a rest condition. The second is an initial state which occurs until the first intermediate FIFO buffers 9-12 become full. The third is a running state corresponding to a normally operating state. The comparator 16 starts at the halt state. The comparator 16 changes from the halt state into the initial state when the input FIFO buffers 1-8 move into before-full conditions where only one word storage section of one of the buffers 1-8 is empty but the remaining word storage sections of this buffer are full while the other buffers are all full. While the comparator 16 remains in the initial state, the comparator 16 sequentially transfers data from the input FIFO buffers 1-8 to the first intermediate FIFO buffers 9-12. This mode of operation of the comparator 16 continues until the first intermediate FIFO buffers 9-12 move into before-full conditions-where only one word storage section of one of the buffers 9-12 is empty but the remaining word storage section of this buffer are full while the other buffers are all full. When the first intermediate FIFO buffers 9-12 move into the before-full conditions, the comparator 16 changes from the initial state to the running state. While the comparator 16 remains in the running state, the comparator 16 transfers data from the input FIFO buffers 1-8 to the unfull first intermediate FIFO buffer so that this intermediate FIFO buffer can become full. The comparator 16 compares data at a bottom of the input FIFO buffer 1 and data at a bottom of the input FIFO buffer 5 and transfers a smaller of the two data to the first intermediate FIFO buffer 9. The comparator 16 compares data at a bottom of the input FIFO buffer 2 and data at a bottom of the input FIFO buffer 6 and transfers a smaller of the two data to the first intermediate FIFO buffer 10. The comparator 16 compares data at a bottom of the input FIFO buffer 3 and data at a bottom of the input FIFO buffer 7 and transfers a smaller of the two data to the first intermediate FIFO buffer 11. The comparator 16 compares data at a bottom of the input FIFO buffer 4 and data at a bottom of the input FIFO buffer 8 and transfers a smaller of the two data to the first intermediate FIFO buffer 12.

The comparator 17 is changeable among the following three states. The first is a halt state corresponding to a rest condition. The second is an initial state which occurs until the second intermediate FIFO buffers 13 and 14 become full. The third is a running state corresponding to a normally operating state. The comparator 17 starts at the halt state. The comparator 17 changes from the halt state into the initial state when the first intermediate FIFO buffers 9-12 move into before-full conditions where only one word storage section of one of the buffers 9-12 is empty but the remaining word storage section of this buffer is full while the other buffers are all full. While the comparator 1-7 remains in initial state, the comparator 17 sequentially transfers data from the first intermediate FIFO buffers 9-12 to the second intermediate FIFO buffers 13 and 14. This mode of operation of the comparator 17 continues until the second intermediate FIFO buffers 13 and 14 move into before-full conditions where only one word storage section of one of the buffers 13 and 14 is empty but the remaining word storage section of this buffer is full while the other buffers are all full. When the second intermediate FIFO buffers 13 and 14 move into the before-full conditions, the comparator 17 changes from the initial state to the running state. While the comparator 17 remains in the running state, the comparator 17 transfers data from the first intermediate FIFO buffers 9–12 to the unfull second intermediate FIFO buffer so that this second intermediate FIFO buffer can become full. The comparator 17 compares data at a bottom of the first intermediate FIFO buffer 9 and data at a bottom of the first intermediate FIFO buffer 11 and transfers a smaller of the two data to the second intermediate FIFO buffer 13. The comparator 17 compares data at a bottom of the first intermediate FIFO buffer 10 and data at a bottom of the first intermediate FIFO buffer 12 and transfers a smaller of the two data to the second intermediate FIFO buffer 14.

The comparator 18 is changeable among the following three states. The first is a halt state corresponding to a rest condition. The second is an initial state which occurs until the output FIFO buffer 15 becomes full. The third is a running state corresponding to a normally operating state. The comparator 18 starts at the halt state. The comparator 18 changes from the halt state into the initial state when the second intermediate FIFO buffers 13 and 14 move into before-full conditions where only one word storage section of one of the buffers 13 and 14 is empty but the remaining word storage section of this buffer is full while the other buffer is full. While the comparator 18 remains in the initial state, the comparator 18 sequentially transfers data from the second intermediate FIFO buffers 13 and 14 to the output FIFO buffer 15. This mode of operation of the comparator 18 continues until the output FIFO buffer 15 moves into before-full conditions where only one word storage section of the buffer 15 is empty but the remaining word storage sections of the buffer 15 are all full. When the output FIFO buffer 15 moves into the before-full conditions, the comparator 18 changes from the initial state to the running state. While the comparator 18 remains in the running state, the comparator 18 transfers data from the second intermediate FIFO buffers 13 and 14 to the output FIFO buffer 15 in synchronism with a timing of the data transfer from the output FIFO buffer 15. The comparator 18 compares data at a bottom of the second intermediate FIFO buffer 13 and data at a bottom of the second intermediate FIFO buffer 14 and transfers a smaller of the two data to the output FIFO buffer 15.

Figure 2:
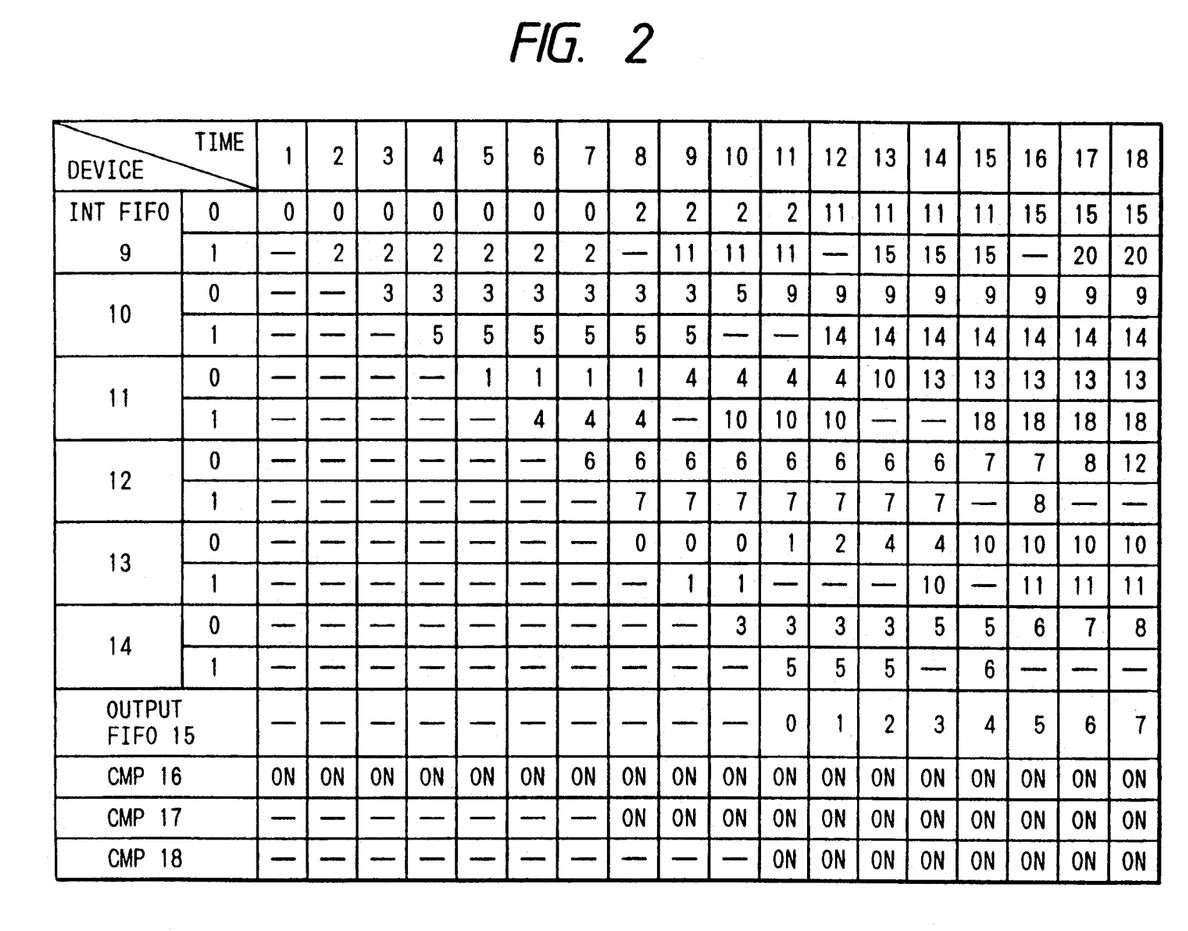
FIG. 2 is a diagram showing the contents of data in the intermediate FIFO buffers and the output FIFO buffer, and the states of the comparators in the merge device of FIG. 1 at varying times.

The operation of the merge device of FIG. 1 will be described with reference to FIG. 2. In each of the left-hand head sections for the intermediate FIFO buffers of FIG. 2, the numerals "0" and "1" denote the first word storage part and the second word storage part respectively. In the body sections for the intermediate FIFO buffers of FIG. 2, the natural numbers denote the contents of stored data in a decimal expression while the character "-" denotes that the related buffer is completely empty. In the sections for the comparators of FIG. 2, the character "ON" denotes that the related comparator is operating while the character "-" denotes that the related comparator is at rest.

During periods denoted by "TIME 1" to "TIME 7", the comparator 17 remains in the halt state. During the period "TIME 7", the first intermediate FIFO buffers 9–12 move into the before-full conditions. Accordingly, when the period "TIME 7" ends and a subsequent period "TIME 8" starts, the comparator 17 changes from the halt state to the initial state. During the period "TIME 8" and subsequent periods "TIME 9" and "TIME 10", the comparator 17 remains in the initial state and the storage locations of the second intermediate FIFO buffers 13 and 14 are sequentially loaded with data.

Specifically, during the period "TIME 8", the comparator 17 compares data at the bottom of the first intermediate FIFO buffer 9 and data at the bottom of the first intermediate FIFO buffer 11 and transfers the smaller data ("0" in the example shown) to the second intermediate FIFO buffer 13. During the period "TIME 9", the comparator 17 compares data at the bottom of the first intermediate FIFO buffer 9 and data at the bottom of the first intermediate FIFO buffer 11 and transfers the smaller data ("1" in the example shown) to the second intermediate FIFO buffer 13. During the period "TIME 10", the comparator 17 compares data at the bottom of the first intermediate FIFO buffer 10 and data at the bottom of the first intermediate FIFO buffer 12 and transfers the smaller data ("3" in the example shown) to the second intermediate FIFO buffer 14.

When the period "TIME 10" ends and a subsequent period "TIME 11" starts, the comparator 17 changes from the initial state to the running state. While the comparator 17 remains in the running state, the comparator 17 transfers data to unfull one of the second intermediate FIFO buffers 13 and 14. In the example shown, during the period "TIME 11", the second intermediate FIFO buffer 14 is unfull at the beginning so that the comparator 17 transfers data ("5" in the example shown) from one of the first intermediate FIFO buffers 10 and 12 to the second intermediate FIFO buffer 14. During a next period "TIME 12", the second intermediate FIFO buffer 13 is unfull at the beginning so that the comparator 17 transfers data ("2" in the example shown) from one of the first intermediate FIFO buffers 9 and 11 to the second intermediate FIFO buffer 13.

Figure 14:
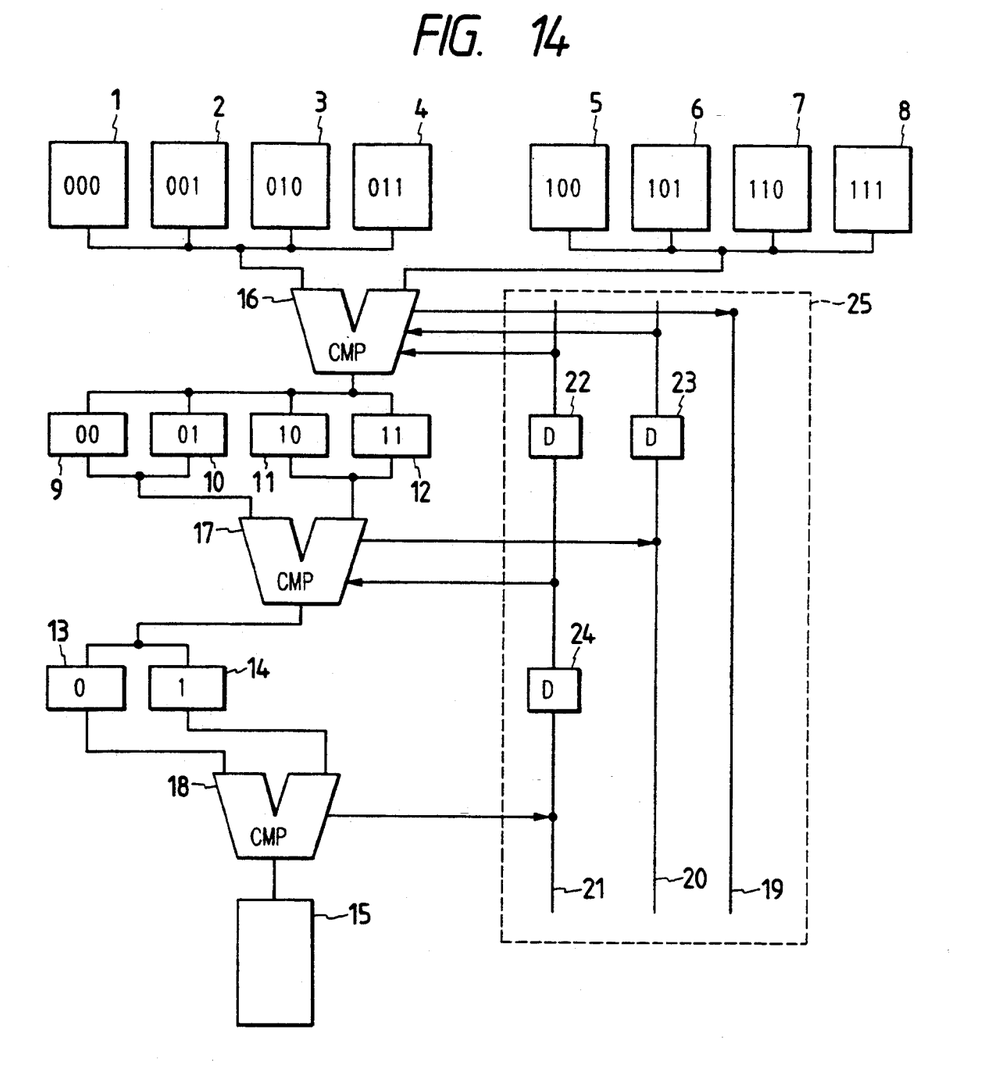
FIG. 14 is a diagram showing addresses of the FIFO buffers of FIG. 1.

As shown in FIG. 14, three-bit identification addresses "000", "001", "010", "011", "100", "101", "110", and "111" are assigned to the input FIFO buffers 1, 2, 3, 4, 5, 6, 7, and 8 respectively. Two-bit identification addresses "00", "01", "10", and "11" are assigned to the first intermediate FIFO buffers 9, 10, 11, and 12 respectively. One-bit identification addresses "0" and "1" are assigned to the second intermediate FIFO buffers 13 and 14 respectively.

Figure 3:
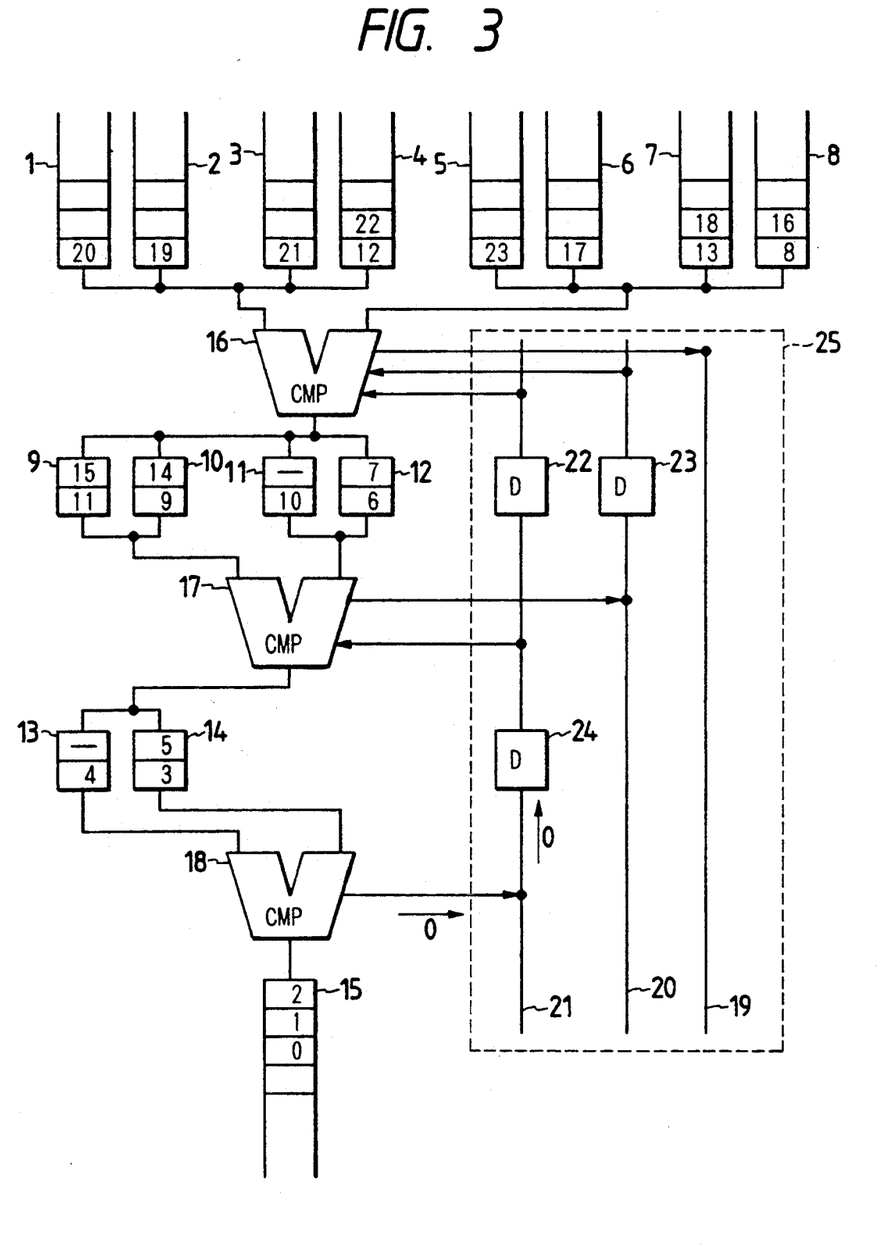
FIG. 3, FIG. 4, and FIG. 5 together are block diagrams of the merge device at different stages respectively.

FIG. 3 shows an example of internal conditions of the merge device which occur during a period "TIME 13". During the period "TIME 13", the comparator 18 transfers data ("2" in the example shown) from one of the second intermediate FIFO buffers 13 and 14 to the output FIFO buffer 15. In addition, the comparator 18 outputs a one-bit control signal to the signal line 21 which depends on whether the comparator 18 transfers data from the second intermediate FIFO buffer 13 or the second intermediate FIFO buffer 14. When the comparator 18 transfers data from the second intermediate FIFO buffer 13, the control signal from the comparator 18 assumes "0". When the comparator 18 transfers data from the second intermediate FIFO buffer 14, the control signal from the comparator 18 assumes "1". Specifically, the control signal is generated in agreement with the address of the second intermediate FIFO buffer from which data is transferred. In the example shown, the comparator 18 transfers data from the second intermediate FIFO buffer 13 to the output FIFO buffer 15, and the control signal from the comparator 18 assumes "0".

Figure 4:
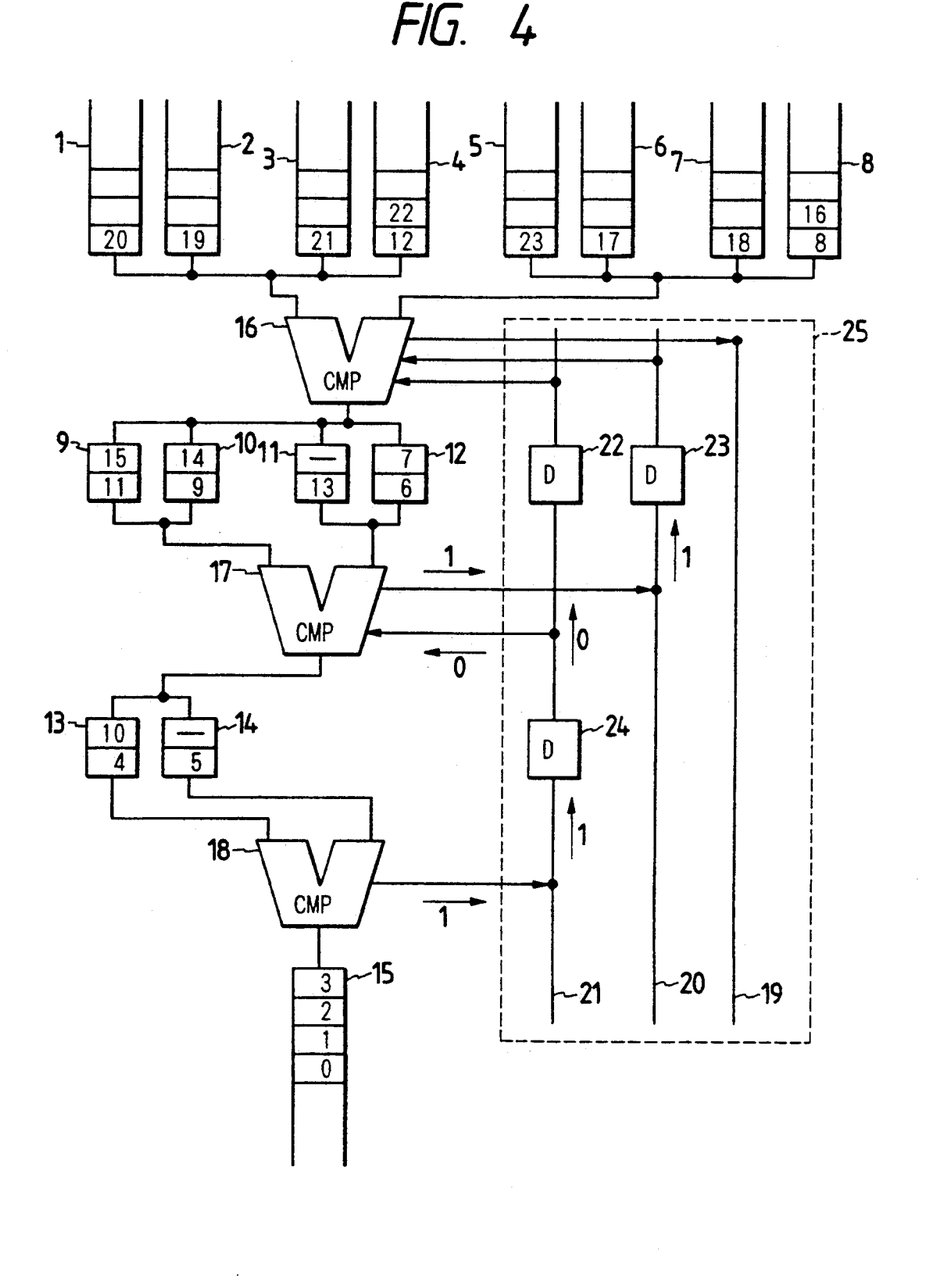

The control signal from the comparator 18 is deferred by the delay element 24 and is transmitted to the comparator 17 and the delay element 22 at a period "TIME 14". FIG. 4 shows an example of internal conditions of the merge device which occur during the period "TIME 14". The delayed control signal from the comparator 18 informs the comparator 17 of whether the comparator 18 transferred data from the second intermediate FIFO buffer 13 or the second intermediate FIFO buffer 14 during the previous period "TIME 13". In the example shown, the delayed control signal from the comparator 18 is "0" and thus the comparator 17 is informed that the comparator 18 transferred data from the second intermediate FIFO buffer 13 during the previous period "TIME 13". The comparator 17 selects two of the first intermediate FIFO buffers 9-12 in response to the information of the delayed control signal from the comparator 18 and compares data at the bottoms of the selected first intermediate FIFO buffers. In the example shown, since the delayed control signal from the comparator 18 informs that the comparator 18 transferred data from the second intermediate FIFO buffer 13 during the previous period "TIME 13", the comparator 17 selects the first intermediate FIFO buffers 9 and 11 and compares data at the bottoms of the buffers 9 and 11. In the example shown, the comparator 17 transfers the data from the first intermediate FIFO buffer 11 to the second intermediate FIFO buffer 13. At the same tune, the comparator 17 outputs a one-bit control signal to the signal line 20 which relates to the data-transferred first intermediate FIFO buffer. When the data is transferred from the first intermediate FIFO buffer 9 or 10, the control signal assumes "0". When the data is transferred from the first intermediate FIFO buffer 11 or 12, the control signal assumes "1". The control signal is generated in agreement with the higher bit of the address of the first intermediate FIFO buffer from which data is transferred. In the example shown, since the data is transferred from the first intermediate FIFO buffer 11, the control signal assumes "1".

Figure 5:
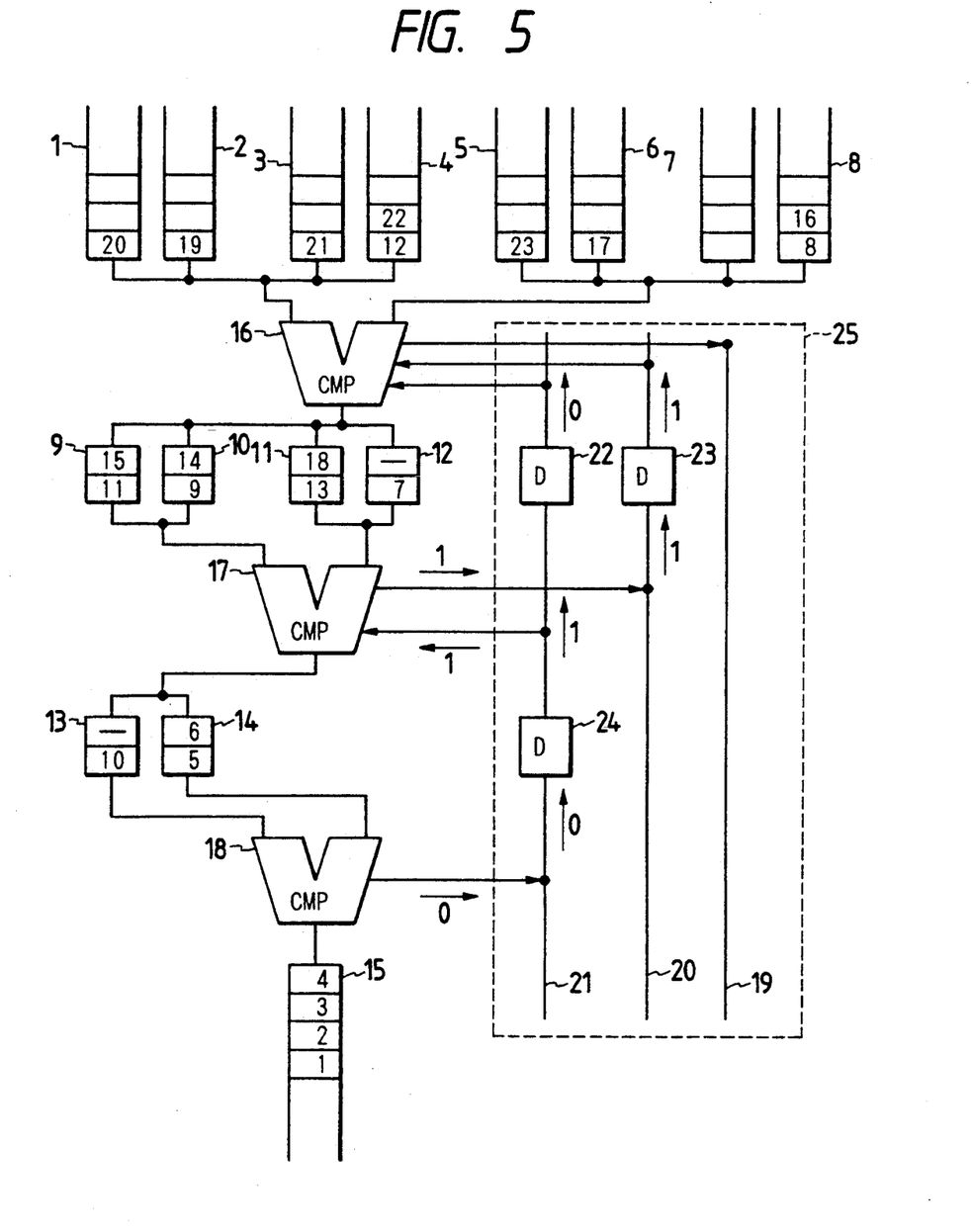

The control signal from the comparator 17 is deferred by the delay element 23 and is transmitted to the comparator 16 at a period "TIME 15". In addition, the control signal from the comparator 18 is further deferred by the delay element 22 and is transmitted to the comparator 16 at the period "TIME 15". FIG. 5 shows an example of internal conditions of the merge device which occur during the period "TIME 15". The delayed control signal from the comparator 17 and the delayed control signal from the comparator 18 are combined into a composite control signal which agrees with the address of the data-transferred first intermediate FIFO buffer and thus which informs the comparator 16 of the data-transferred first intermediate FIFO buffer. In the example shown, the delayed control signal from the comparator 17 is "1" and the delayed control signal from the comparator 18 is "0", and the two delayed control signals are combined into a composite control signal "10" which agrees with the address of the first intermediate FIFO buffer 11 and thus which informs the comparator 16 that the data was transferred from the first intermediate FIFO buffer 11 during the previous period "TIME 14". The comparator 16 selects two of the input FIFO buffers 1-8 in response to the information of the delayed control signals from the comparators 17 and 18 and compares data at the bottoms of the selected input FIFO buffers. In the example shown, since the delayed control signals from the comparators 17 and 18 inform that the data was transferred from the first intermediate FIFO buffer 11 during the previous period "TIME 14", the comparator 16 selects the input FIFO buffers 3 and 7 and compares data at the bottoms of the buffers 3 and 7. In the example shown, the comparator 16 transfers the data from the input FIFO buffer 7 to the first intermediate FIFO buffer 11. At the same time, the comparator 16 outputs a one-bit control signal to the signal line 19 which agrees with the highest bit of the address of the data-transferred input FIFO buffer. This control signal is used together with the control signals from the comparators 17 and 18 by a circuit (not shown) for the control of the data transfer to the input FIFO buffers 1-8.

Figure 8:
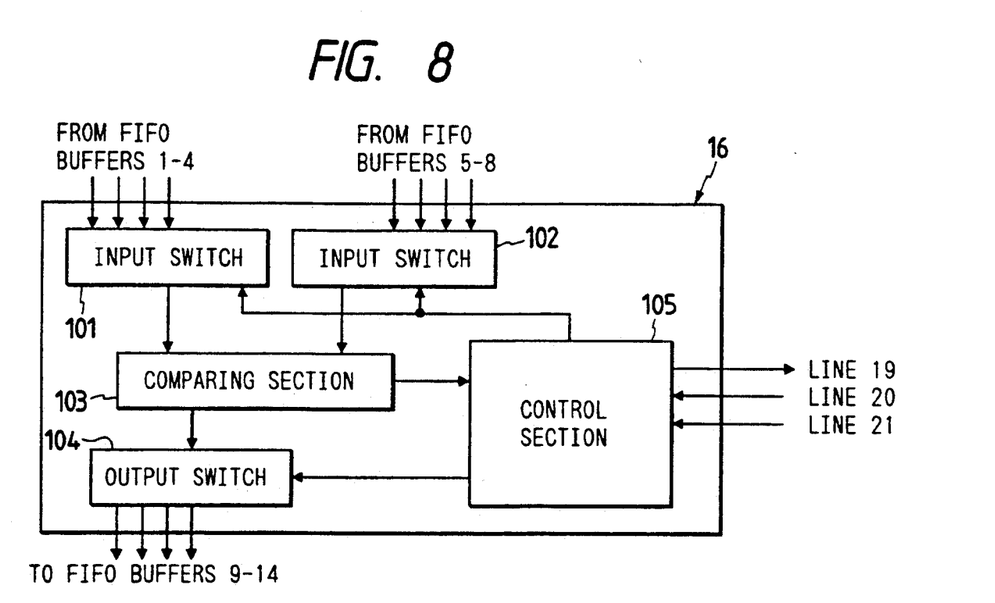
FIGS. 8, 9, and 10 are each block diagrams of the comparators of FIG. 1.

As shown in FIG. 8, the comparator 16 includes input switches 101 and 102, a comparing section 103, an output switch 104, and a control section 105. The input switch 101 selects one of the input FIFO buffers 1-4 in response to a switch control signal from the control section 105 and feeds data from the selected input FIFO buffer to a first input terminal of the comparing section 103. Similarly, the input switch 102 selects one of the input FIFO buffers 5-8 in response to the switch control signal from the control section 105 and feeds data from the selected input FIFO buffer to a second input terminal of the comparing section 103. The comparing section 103 compares data at its first input terminal and data at its second input terminal, and transfers the smaller of the two compared data to the output switch 104. The output switch 104 selects one of the first intermediate FIFO buffers 9-12 in response to a switch control signal from the control section 105, and transfers the smaller of the two compared data to the selected first intermediate FIFO buffer. The control section 105 generates the switch control signals in accordance with the control signals from from the comparators 17 and 18. For example, the control section 105 includes decoders or ROMs. The comparing section 103 generates a signal related to the input FIFO buffer from which data is transferred, and this signal is transmitted to the signal line 19 via the control section 105.

Figure 11:
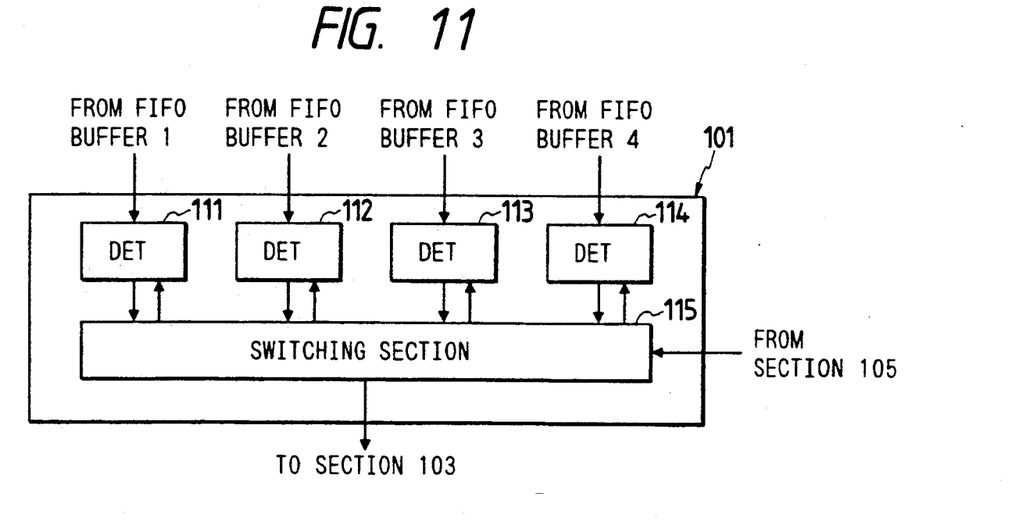
FIG. 11 is a block diagram of the input switch of FIG. 8.

Since the input switches 101 and 102 have similar internal designs, only the internal design of the input switch 101 will be described in detail. As shown in FIG. 11, the input switch 101 includes detectors 111, 112, 113, and 114, and a switching section 115. The detectors 111, 112, 113, and 114 are connected between the switching section 115 and the input FIFO buffers 1-4. The detectors 111-114 detect the states of the input FIFO buffers 1-4 respectively. The detectors 111-114 enables the detection of the before-full conditions of the input FIFO buffers 1-4. The switching section 115 selects one of the input FIFO buffers 1-4 in response to the switch control signal from the control section 105, and feeds data from the selected input FIFO buffer to the comparing section 103.

Figure 12:
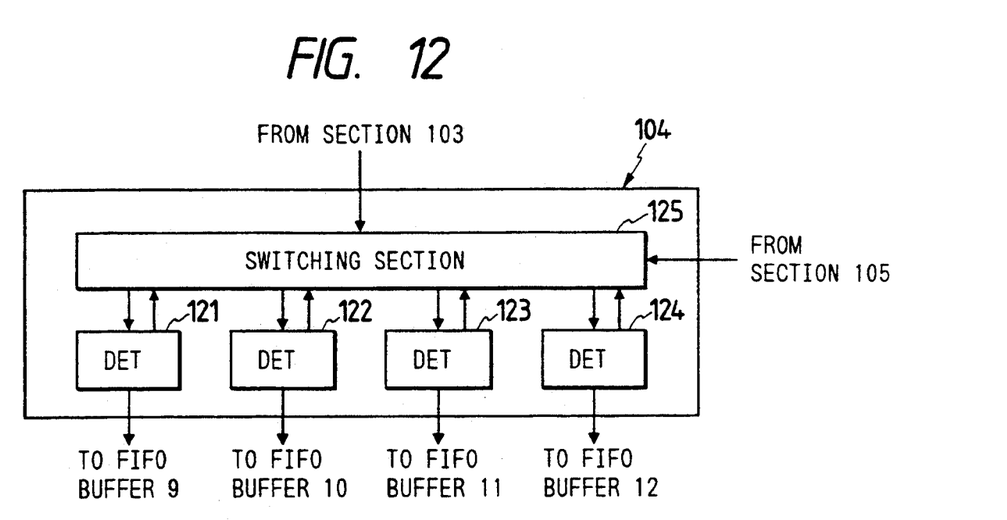
FIG. 12 is a block diagram of the output switch of FIG. 8.

As shown in FIG. 12, the output switch 104 includes detectors 121, 122, 123, and 124, and a switching section 125. The detectors 121, 122, 123, and 124 are connected between the switching section 125 and the first intermediate FIFO buffers 9-12. The detectors 121-124 detect the states of the first intermediate FIFO buffers 9-12. The detectors 121-124 enables the detection of the before-full conditions of the first intermediate FIFO buffers 9-12. The switching section 125 selects one of the first intermediate FIFO buffers 9-12 in response to the switch control signal from the control section 105, and transfers data from the comparing section 103 to the selected first intermediate FIFO buffer.

Figure 13:
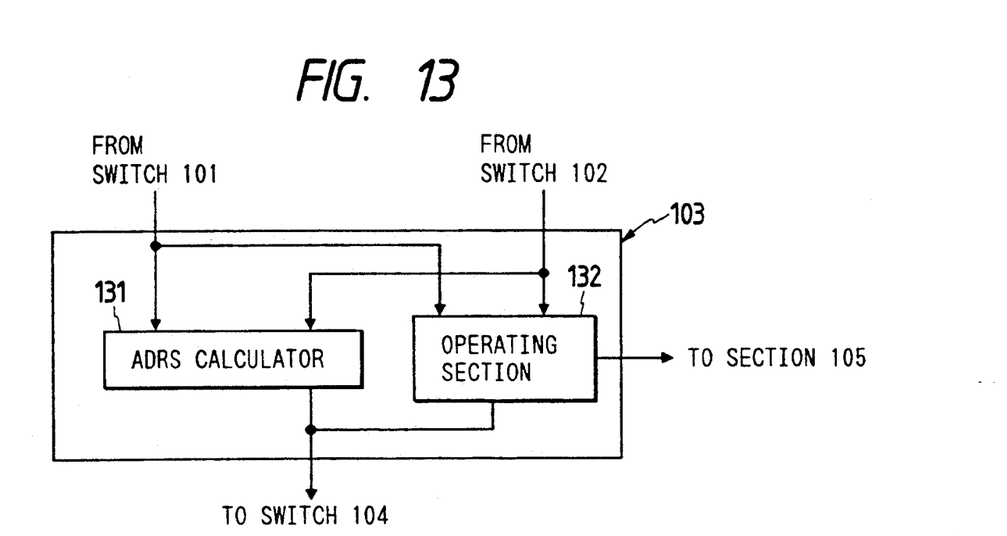
FIG. 13 is a block diagram of the comparing section of FIG. 8.

As shown in FIG. 1-3, the comparing section 103 includes an address calculator 131 and an operating section 132. As explained previously, data from one of the input FIFO buffers 1-4 and also data from one of the input FIFO buffers 5-8 are fed to the comparing section 103 via the input switches 101 and 102. Each of data from the input FIFO buffers 1-8 is composite, having an address part and a data part. The address part contains the address of the input FIFO buffer from which the related data is transferred. The data part of the composite data from selected one of the input FIFO buffers 1-4 and also the data part of the composite data from selected one of the input FIFO buffers 5-8 are fed to the operating section 132. The operating section 132 compares the two fed data parts, selecting the smaller of the two fed data parts and outputting the selected data to the output switch 104. In addition, the operating section 132 generates a control signal representing which of the two data parts is selected, that is, relating to the input FIFO buffer from which data is transferred. This control signal is fed to the control section 105. The address part of the composite data from selected one of the input FIFO buffers 1-4 and also the address part of the composite data from selected one of the input FIFO buffers 5-8 are fed to the address calculator 131. The address calculator 131 calculates a new address from the two fed address parts through an AND operation. For this purpose, the address calculator 131 has an AND circuit. The calculated new address agrees with the address of the first intermediate FIFO buffer to which the data is transferred from the comparing section 103. For example, in the case where the two composite data fed to the comparing section 103 come from the input FIFO buffers 2 and 5, the addresses of the input FIFO buffers 2 and 5 are "001" and "101" (see FIG. 14) so that the AND operation between these addresses results in "001". The address calculator 131 accepts the two lower bits of the resultant address and thereby generates a new address "01". It is understood from FIG. 14, the address "01" corresponds to the first intermediate FIFO buffer 10. The calculated new address is combined with the output data from the operating section 132 to form new composite data which is fed to the output switch 104.

Figure 9:
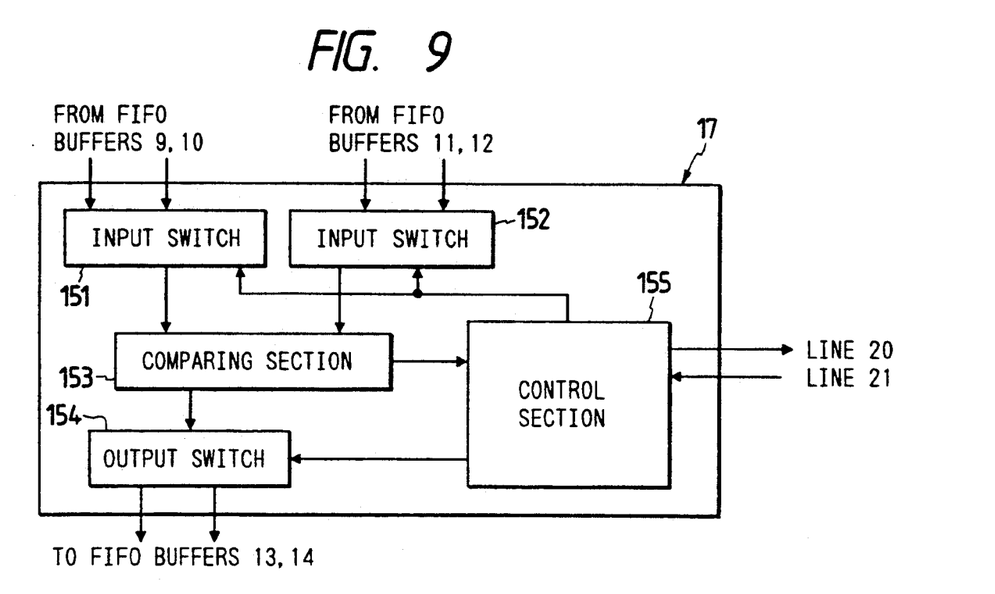

As shown in FIG. 9, the comparator 17 includes input switches 151 and 152, a comparing section 153, an output switch 154, and a control section 155. The input switch 151 selects one of the first intermediate FIFO buffers 9 and 10 in response to a switch control signal from the control section 155 and feeds data from the selected first intermediate FIFO buffer to a first input terminal of the comparing section 153. Similarly, the input switch 152 selects one of the first intermediate FIFO buffers 11 and 12 in response to the switch control signal from the control section 155 and feeds data from the selected first intermediate FIFO buffer to a second input terminal of the comparing section 153. The comparing section 153 compares data at its first input terminal and data at its second input terminal, and transfers the smaller of the two compared data to the output switch 154. The output switch 154 selects one of the second intermediate FIFO buffers 13 and 14 in response to a switch control signal from the control section 155, and transfers the smaller of the two compared data to the selected second intermediate FIFO buffer.

The control section 155 generates the switch control signals in accordance with the control signal from the comparator 18. For example, the control section 150 includes decoders or ROMS. The comparing section 153 generates a signal related to the first intermediate FIFO buffer from which data is transferred, and this signal is transmitted to the signal line 20 via the control section 155. The internal designs of the input switches 151 and 152, the comparing section 153, and the output switch 133 are similar to the internal designs of the corresponding elements in the comparator 16.

Figure 10:
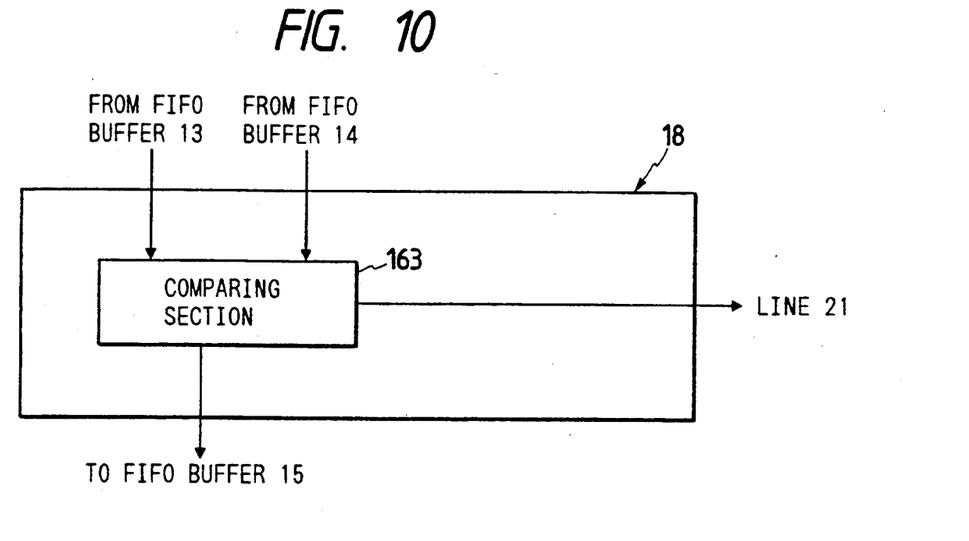

As shown in FIG. 10, the comparator 18 includes a comparing section 163 receiving the two data from the second intermediate FIFO buffers 13 and 14. The comparing section 163 compares the two received data, and selects the smaller of the two data and transfers the selected data to the output FIFO buffer 15. The comparing section 163 generates a control signal related to the second intermediate FIFO buffer from which data is transferred, and this control signal is transmitted to the signal line 21. The internal design of the comparing section 163 is similar to the internal design of the corresponding element in the comparator 16.

The number of the comparators in the merge device of the embodiment of this invention is smaller than the number of the comparators in the prior-art merge device of FIG. 6. In addition, as understood from FIGS. 2 and 7, the activity rate of the comparators in the merge device of the embodiment of this invention is higher than the activity rate of the comparators in the prior-art merge device of FIG. 6.

It should be noted that the embodiment of this invention may be modified in various ways. For example, in a first modification of the embodiment of this invention, each of the intermediate FIFO buffers has a capacity corresponding to three or more words.

What is claimed is:

1. A merge device comprising:
   input FIFO buffers for storing sorted data, wherein a number of the input FIFO buffers equals a first predetermined number N equal to $2^n$ where n denotes a second predetermined number;
   comparators whose number equals the second predetermined number n;
   intermediate FIFO buffers each having a capacity corresponding to at least two words, wherein a number of the intermediate FIFO buffers equals the first predetermined number N minus 2, and wherein identification numbers (i,j) are assigned to the intermediate FIFO buffers respectively where $i=1, n-1$ and where $j=1, 2^{(n-i)}$; and
   an output FIFO buffer;
   wherein a first of the comparators outputs a merge result of an i-th of the input FIFO buffers and an (i+N/2)-th of the input FIFO buffers to a (1,i)-th of the intermediate FIFO buffers where $i=1, N/2$;
   wherein a j-th of the comparators outputs a merge result of a (j−1, i)-th of the intermediate FIFO buffers and a $(j-1, i+2^{n-j})$-th of the intermediate FIFO buffers to a (j,i)-th of the intermediate FIFO buffers where $j=1, n-1$ and where $i=1, 2^{(n-j)}$;
   wherein an n-th of the comparators outputs a merge result of an (n−1,1)-th of the intermediate FIFO buffers and an (n−1,2)-th of the intermediate FIFO buffers to the output FIFO buffer.

2. The merge device of claim 1 further comprising:
   control lines whose number equals the second predetermined number n;

an output terminal making output from an i-th of the comparators to an i-th of the control lines where i=1, n;

input terminals making input from a j-th of the control lines to an i-th of the comparators where j=i+1, n, wherein a number of the input terminals equals n−i;

a delay element disposed on a j-th of the control lines and between an i-th of the comparators and a (i+1)-th of the comparators;

wherein an input signal from a j-th of the control lines is set to an integer having (n−i) bits where j=i+1, n; and wherein integers having an (n−i+1)-th bit to which 0 and 1 are added are set to k, 1 respectively;

wherein an i-th of the comparators performs merge action on an (i,k)-th of the intermediate FIFO buffers and an (i,1)-th of the intermediate FIFO buffers;

wherein an i-th of the comparators outputs 0 to an i-th of the control lines when an (i,k-th of the intermediate FIFO buffers is selected, and an i-th of the comparators outputs 1 to an i-th of the control lines when an (i,1)-th of the intermediate FIFO buffers is selected.

3. A merge device comprising:

four first FIFO buffers;

two second FIFO buffers;

means for selecting two from among said four first FIFO buffers, said means for selecting being operatively connected to at least said four first FIFO buffers and selecting said two first FIFO buffers in correspondence to the location of a single open space for data in one of said second FIFO buffers; and means for comparing two data from the respective first FIFO buffers selected by said selecting means, said two data being input directly into said means for comparing from said means for selecting, said means for comparing arranged to select one of the two data in accordance with a result of comparing said two data and transferring the selected one data to an open space in said second FIFO buffers.

4. A merge device comprising:

first, second, third, fourth, fifth, sixth, and seventh FIFO buffers, wherein the first buffer and the third buffer form a first pair, and the second buffer and the fourth buffer form a second pair;

means for selecting one of the buffer first pair and the buffer second pair in accordance with a control signal;

a first comparator comparing two data in the respective buffers in the buffer pair selected by said selecting means, the first comparator selecting one of the two data in the buffers in the selected buffer pair in accordance with said comparing, the first comparator transferring the selected data;

means for, when said selecting means selects the buffer first pair, transferring the data selected by the first comparator from one of the buffers in the buffer first pair to the fifth buffer;

means for, when said selecting means selects the buffer second pair, transferring the data selected by the first comparator from one of the buffers in the buffer second pair to the sixth buffer;

a second comparator comparing two data in the respective fifth and sixth buffers, the second comparator selecting one of the two data in the respective fifth and sixth buffers in accordance with a result of said comparing, the second comparator transferring the selected data from one of the fifth and sixth buffers to the seventh buffer; and means for generating the control signal in accordance with the result of said comparing in the second comparator.

* * * * *